US007539950B2

(12) United States Patent
Pankovcin

(10) Patent No.: US 7,539,950 B2
(45) Date of Patent: *May 26, 2009

(54) METHOD AND SYSTEM FOR DISPLAYING CATEGORIZED INFORMATION ON A USER INTERFACE

(75) Inventor: Igor Pankovcin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/215,168

(22) Filed: Aug. 30, 2005

(65) Prior Publication Data

US 2006/0005150 A1   Jan. 5, 2006

Related U.S. Application Data

(63) Continuation of application No. 09/839,438, filed on Apr. 20, 2001, now Pat. No. 7,007,244.

(51) Int. Cl.
*G06F 3/00*   (2006.01)

(52) U.S. Cl. .................. 715/853; 715/712; 715/713; 715/810; 715/817; 715/818; 715/819; 715/820; 715/826; 715/854; 709/207

(58) Field of Classification Search ......... 715/712–713, 715/810, 817–826, 853
See application file for complete search history.

(56) References Cited

U.S. PATENT DOCUMENTS

| 4,939,507 | A | * | 7/1990 | Beard et al. | 345/156 |
| 5,065,347 | A | * | 11/1991 | Pajak et al. | 715/835 |
| 5,790,117 | A | * | 8/1998 | Halviatti et al. | 715/744 |
| 6,012,081 | A | | 1/2000 | Dorn et al. | |
| 6,026,362 | A | * | 2/2000 | Kim et al. | 705/1 |
| 6,047,357 | A | * | 4/2000 | Bannon et al. | 711/133 |
| 6,147,687 | A | * | 11/2000 | Wanderski | 715/853 |
| 6,211,877 | B1 | * | 4/2001 | Steele et al. | 715/804 |
| 6,226,787 | B1 | * | 5/2001 | Serra et al. | 717/125 |
| 6,282,701 | B1 | * | 8/2001 | Wygodny et al. | 717/125 |
| 6,525,748 | B1 | * | 2/2003 | Belfiore et al. | 715/855 |
| 6,559,871 | B1 | * | 5/2003 | Brozowski et al. | 715/853 |
| 6,604,103 | B1 | | 8/2003 | Wolfe | |
| 6,670,969 | B1 | * | 12/2003 | Halstead et al. | 715/762 |
| 6,724,403 | B1 | * | 4/2004 | Santoro et al. | 715/765 |
| 6,785,728 | B1 | * | 8/2004 | Schneider et al. | 709/229 |

(Continued)

OTHER PUBLICATIONS

East 1.3; East Presentation Nov. 1999.*

(Continued)

*Primary Examiner*—Sy D Luu
*Assistant Examiner*—Linh K Pham
(74) *Attorney, Agent, or Firm*—Lee & Hayes, PLLC

(57) ABSTRACT

A computer implemented method and system for displaying categorized information on a user interface is provided, in which the user may choose one or more categories of information. In response, data associated with the chosen category is retrieved. The display of the categories and the retrieval of the data is performed independently, so that the displayed categories remain responsive to user interaction while the data is being retrieved. In one implementation, the display of the categories and information on the user interface is handled by the main thread and the retrieval of the data associated with the chosen category is performed by a worker thread executing asynchronously with respect to the main thread.

20 Claims, 12 Drawing Sheets

U.S. PATENT DOCUMENTS

| | | | |
|---|---|---|---|
| 6,804,686 B1 * | 10/2004 | Stone et al. | 707/104.1 |
| 6,823,518 B1 * | 11/2004 | Bliss et al. | 719/310 |
| 7,061,633 B1 * | 6/2006 | Shima | 358/1.15 |
| 7,076,546 B1 * | 7/2006 | Bates et al. | 709/224 |
| 7,120,901 B2 * | 10/2006 | Ferri et al. | 717/128 |
| 7,165,150 B2 * | 1/2007 | Alverson et al. | 711/145 |
| 7,185,058 B2 * | 2/2007 | Blackwell et al. | 709/206 |
| 7,426,732 B2 * | 9/2008 | Alverson et al. | 718/108 |
| 7,426,735 B2 * | 9/2008 | Bliss et al. | 719/310 |
| 7,478,368 B2 * | 1/2009 | Hoover et al. | 717/125 |
| 2001/0018698 A1 * | 8/2001 | Uchino et al. | 707/533 |
| 2002/0087949 A1 * | 7/2002 | Golender et al. | 717/124 |
| 2002/0113816 A1 * | 8/2002 | Mitchell et al. | 345/734 |
| 2002/0156825 A1 * | 10/2002 | Hoover et al. | 709/105 |

OTHER PUBLICATIONS

East Screen Dump; U.s. Patent & Tradmaks Office; Copyright 1999.*
Professional MFC with Visual C++, 1999, pp. 457-465, Wrox Press, UK.
Win32 Multithread Programming, 1998, pp. 303-304, O'Reilly & Associates, US.
Debugging C Programs, Dr. Dobb's Journal, Winter 1989, pp. 56-60, 93-94.
Software Test Automation, 1999, pp. 81-100, 149, Addison-Wesley, UK.
MAC2-A Macro Processor For Modula-2, Journal of Pascal, ADA & Modula-2, Jan./Feb. 1990, pp. 28-34.

* cited by examiner

METHOD AND SYSTEM FOR DISPLAYING CATEGORIZED INFORMATION ON A USER INTERFACE

CROSS REFERENCE TO RELATED APPLICATIONS

This Application is a continuation of pending U.S. patent application Ser. No. 09/839,438, filed 20 Apr. 2001, entitled "Method and System for Displaying Categorized Information on a User Interface". The Applicant hereby claims the benefit of the filing date of this previous application to the fullest extent permitted by 35 U.S.C. § 120.

TECHNICAL FIELD OF THE INVENTION

The invention relates generally to the display of categorized information on a user interface and, more particularly, to the display of categories on a user interface in a way that is independent from the display of data associated with the categories.

BACKGROUND OF THE INVENTION

There are many ways in which data can be presented to a user on a user interface. One of the more popular ways is organize the data into categories and present the categories on one part of the screen. The user may then select a category and in response, the user interface displays data relating to the selected category on another part of the screen. Referring to FIG. 1, for example, a user interface 10 is shown. The user interface 10 includes a left pane 4 and a right pane 6. A disk directory is presented as a set of folder icons 2 in the left pane 4. Each folder icon 2 represents a sub-directory. When the user selects a folder icon, the folder icon is highlighted and files within the sub-directory represented by the selected folder icon are displayed in the right pane 6. In one popular type of categorized presentation, the categories are organized into a graphical hierarchy, such as a tree. Referring to FIG. 2, for example, the folder icons 2 from FIG. 1 are displayed as nodes or "branches" of a tree 12.

Manipulating categorized user interfaces can be frustrating for the user, however, this is especially true when the categories themselves or the data associated with the categories take a long time to retrieve. For example, if the user selects the "documents" folder (FIG. 2) the computer has to retrieve the names of the files located in the sub-directory "documents" so that they can be displayed in the pane 6. However, if one or more of the files is located on a remote computer to which the network link has been lost, the user interface will be frozen, and the user will receive a "wait" cursor 8 (FIG. 3) while his computer attempts in vain to find the files in the "documents" sub-directory.

Thus, it can be seen that there is a need for a method and system for displaying categorized information on a user interface that overcomes these limitations.

SUMMARY OF THE INVENTION

In accordance with this need, a computer implemented method and system for displaying categorized information on a user interface is provided, in which the user may choose one or more categories of information. In response, data associated with the chosen category is retrieved. The display of the categories and the retrieval of the data is performed independently, so that the displayed categories remain responsive to user interaction while the data is being retrieved. In one implementation, the display of the categories and information on the user interface is handled by the main thread and the retrieval of the data associated with the chosen category is performed by a worker thread executing asynchronously with respect to the main thread.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and system for displaying categorized information on a user interface in which data is organized into selectable categories that are displayed on a screen. A user may then select a category and, in response, data belonging to that category is retrieved in such a way that it does not interfere with the ability of the user to continue to select and/or manipulate the categories. In an embodiment of the invention, the task of displaying the categories, the task of retrieving subcategories, and the task of retrieving the data corresponding to the category selected by the user are handled by separate, independent threads, including: a main thread for interacting with the user with respect to the categories, and at least one other thread for retrieving the data associated with the selected category.

Although it is not required, the invention may be implemented by computer-executable instructions, such as program modules, that are executed by a computer. Generally, program modules include routines, programs, objects, components, data structures and the like that perform particular tasks or implement particular abstract data types. On many computers, modules execute within an address space of the computer's memory, which is typically defined as a "process." The point of execution of the program instructions is often referred to as a "thread." As is conventional, multiple threads of execution may exist for a single program in a process. Multiple processes may be executed on a single machine, with each process having one or more threads of execution. Thus, when multiple threads are discussed herein, it may mean multiple threads in a single process or multiple threads in different processes.

The invention may be implemented on a variety of types of computers, including personal computers (PCs), hand-held devices, multi-processor systems, microprocessor-based on programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
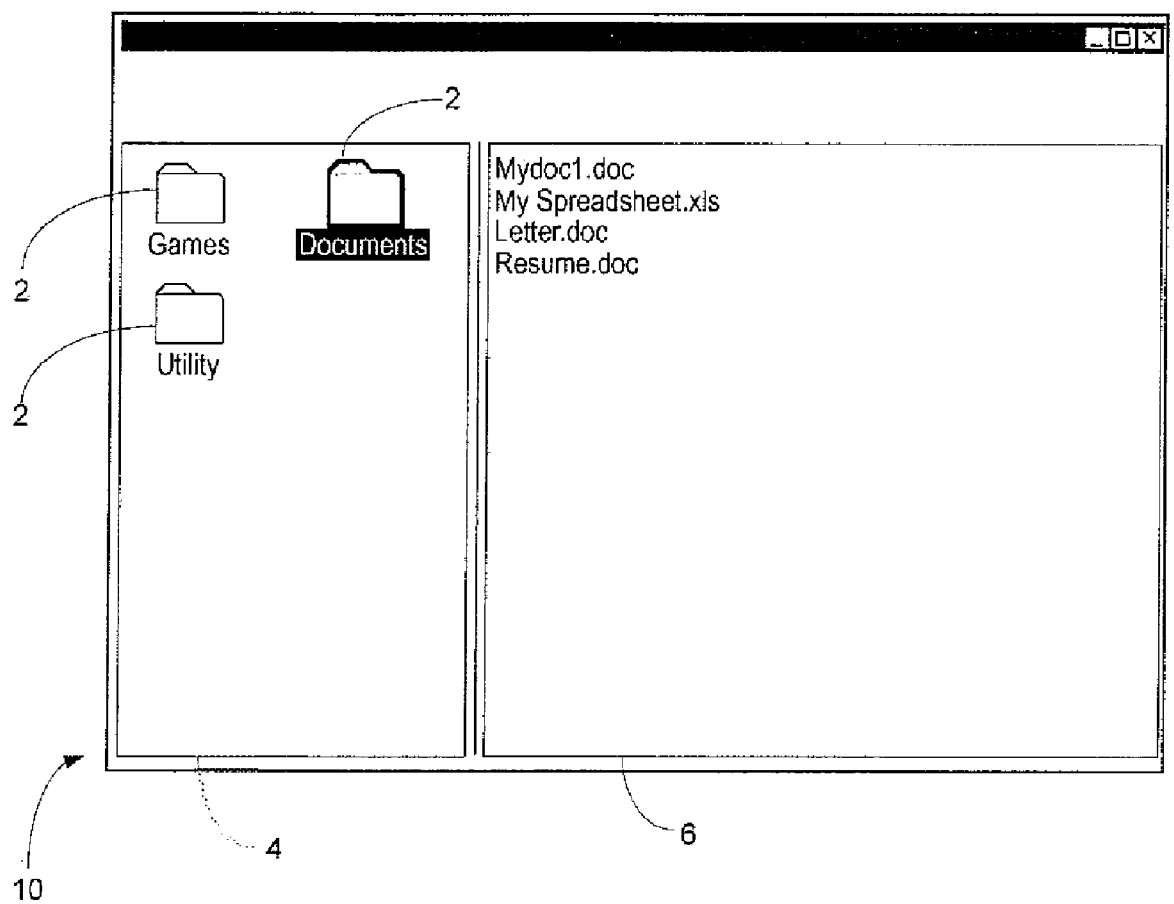
FIGS. 1-3 are examples of categorized user interfaces.
Figure 2:
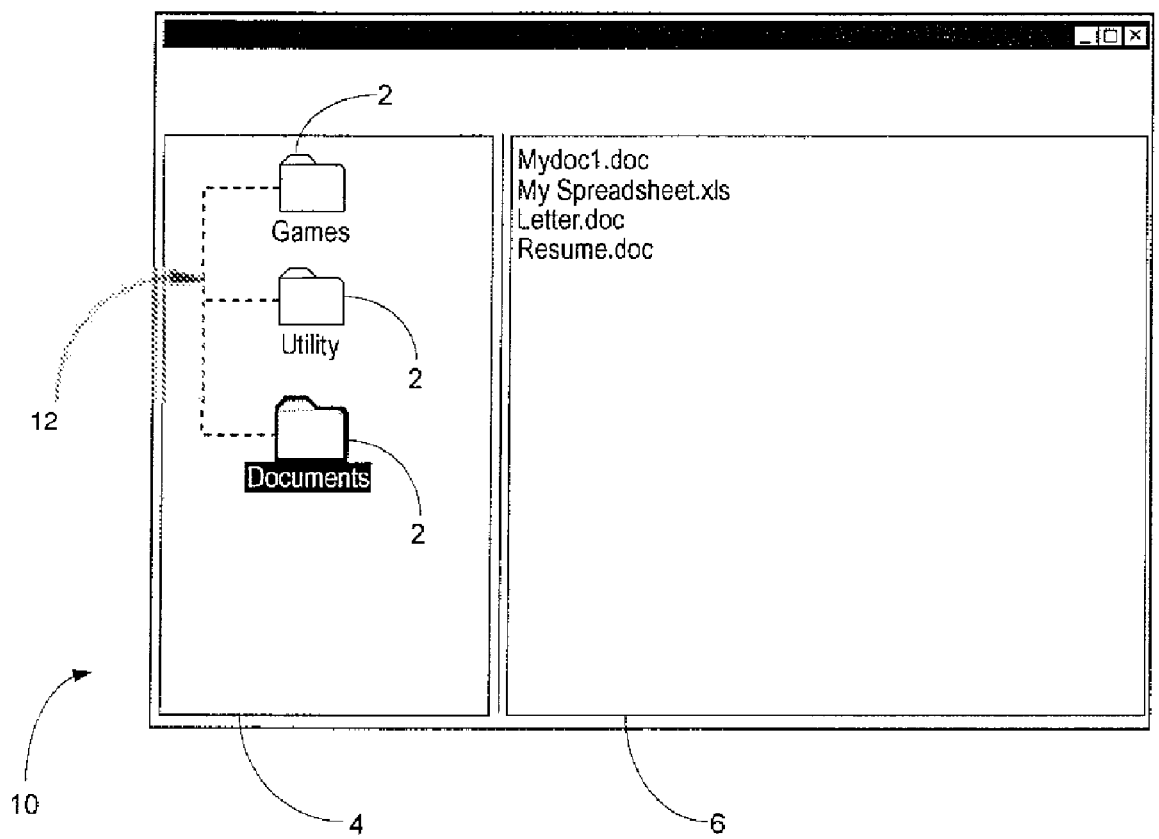
Figure 3:
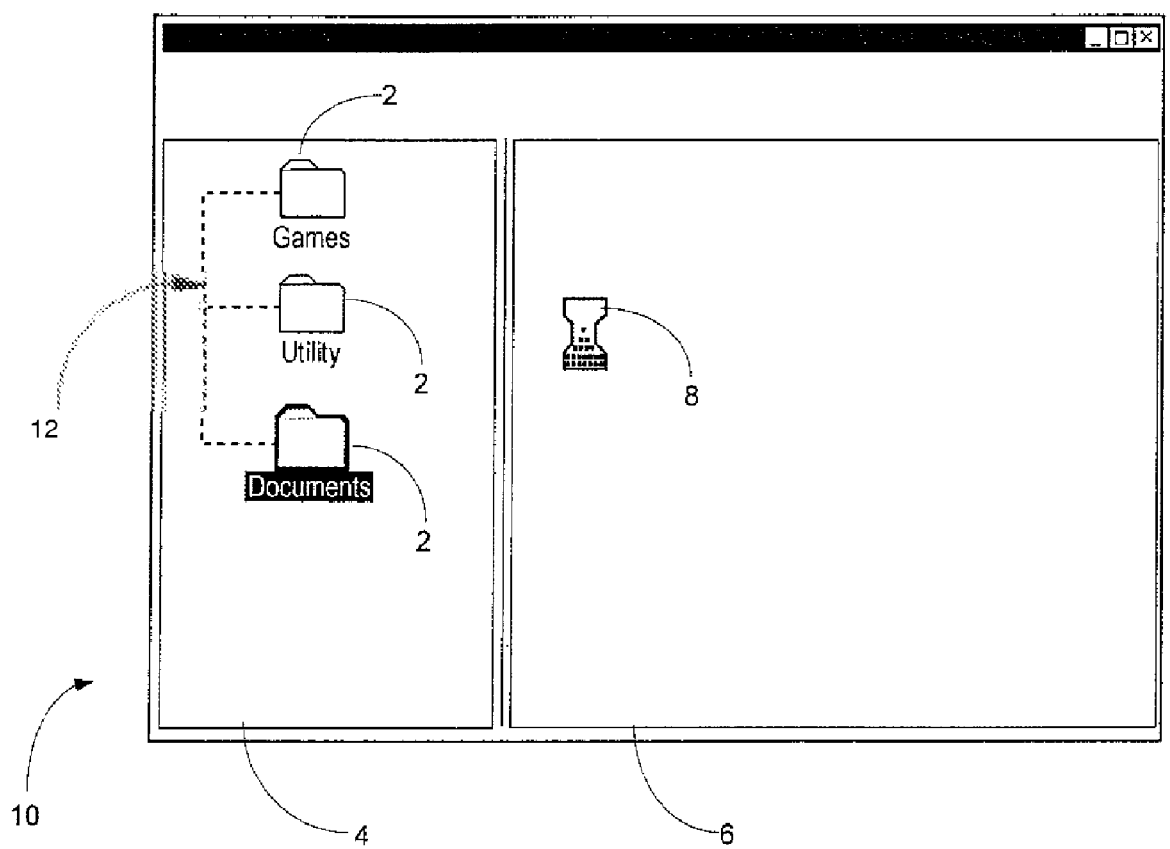
Figure 4:
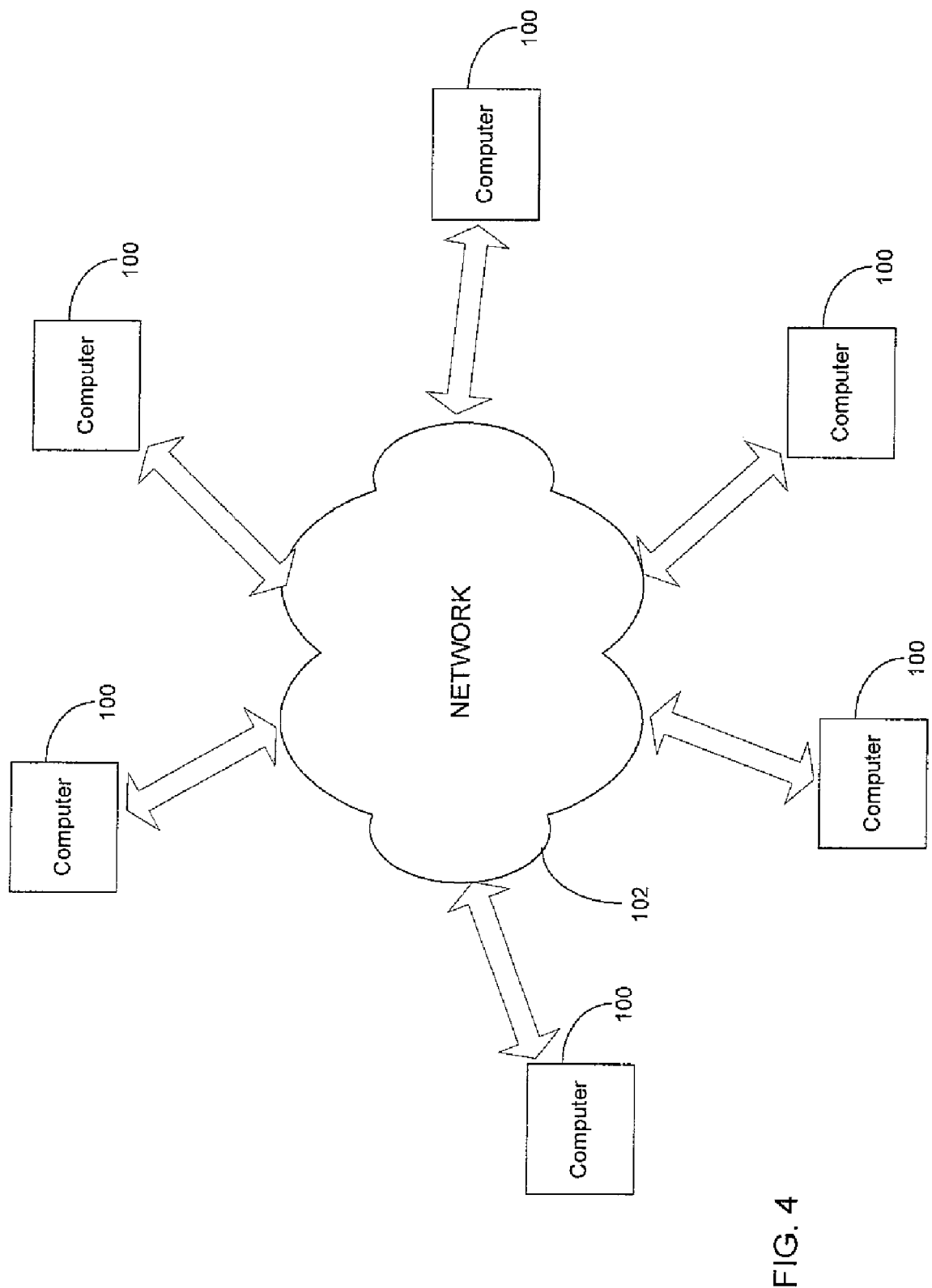
FIG. 4 is an example of a computer network.

An example of a networked environment in which this system may be used will now be described with reference to FIG. 4. The example network 102 includes several computers 100 communicating with one another. The network 102 may include many well-known components, such as routers, gateways, hubs, etc. and may allow the computers 100 to communicate via wired and/or wireless media.

Figure 5:
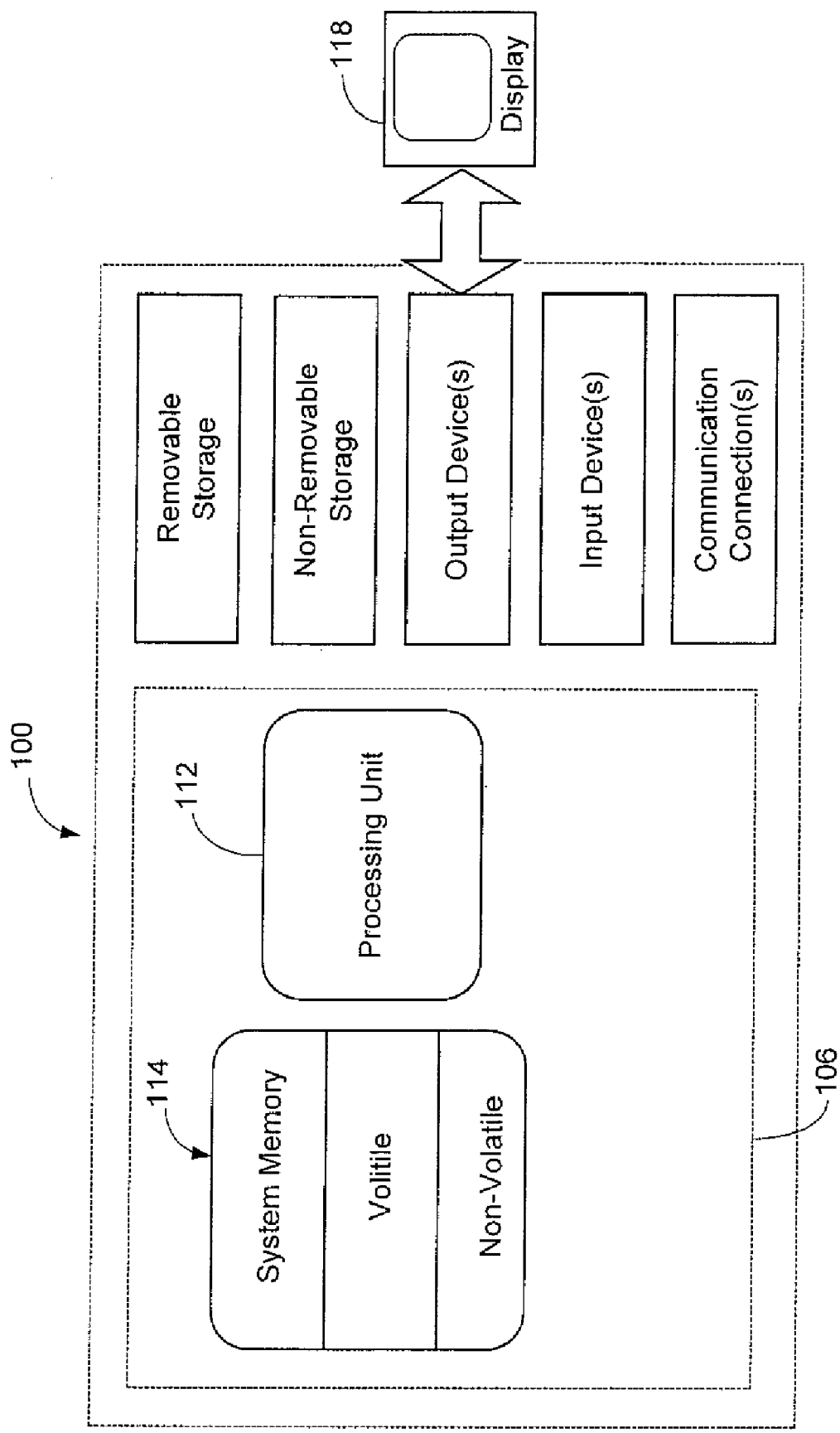
FIG. 5 is an example of a computer.

Referring to FIG. 5, an example of a computer on which the invention described herein may be implemented is shown. In its most basic configuration, the computer, generally labeled 100, typically includes at least one processing unit 112 and memory 114. Depending on the exact configuration and type of the computer, the memory 114 may be volatile (such as RAM), non-volatile (such as ROM or flash memory) or some combination of the two. This most basic configuration is illustrated in FIG. 5 by dashed line 106. The computer 100 may also have additional features/functionality. For example, computer 100 may include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computer 100. Any such computer storage media may be part of computer 100.

Computer 100 may also contain communications connections that allow it to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not of limitation, communication media includes wired media such as a wired network or direct-wired connection, and wireless media such as acoustic, RF, infrared and other wireless media. The term computer-readable media as used herein includes both storage media and communication media.

Computer 100 may also have input devices such as a keyboard, mouse, pen, voice input device, touch input device, etc. Output devices such as a display 118, speakers, a printer, etc. may also be included. All these devices are well known in the art and need not be discussed at length here.

Figure 6:
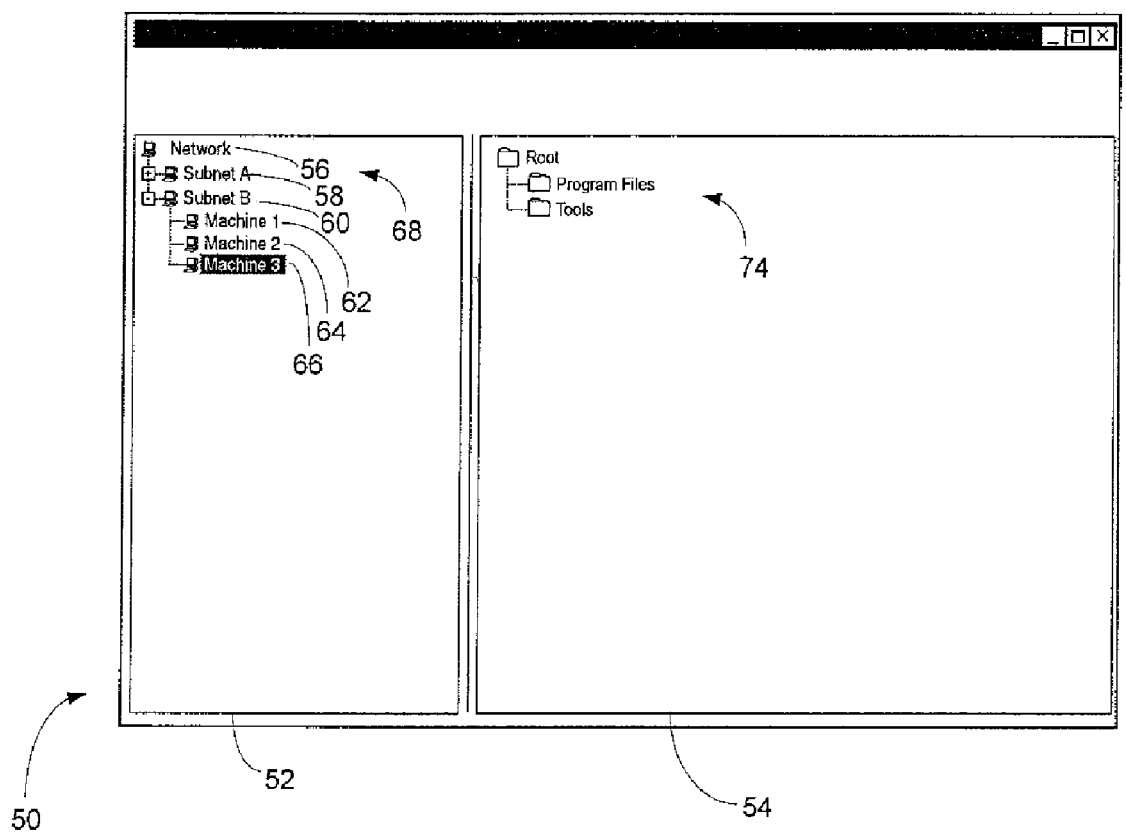
FIGS. 6-8 show possible features of a user interface that may be displayed according to an embodiment of the invention.

A user interface that operates in accordance with the teachings of the invention may be implemented in a variety of ways. In one embodiment, the interface has one area for displaying the categories into which the information is organized, and another area for displaying data associated one or more of the categories as specified by the user. Referring to FIG. 6, for example, a user interface 50 displays disk directory information that is categorized according to the part of the network in which it is located and according to the computer on which it is located. The categories include network, sub-network ("subnet") and computer ("machine"). The user interface 50 includes a left pane 52 and a right pane 54. A tree 68 is displayed in the left pane 52. The tree 68 includes nodes 56, 58, 60, 62, 64, and 66 that can be expanded or collapsed by the user. Each node represents a category. For example, the node 60 represents the category "Disk directories of computers in Subnet B" ("Subnet B" for short) while the node 66 represents the category "Disk directory of Machine 3" ("Machine 3" for short). The right pane 54 contains data associated with the category selected in the left pane 52. In this example, the user has selected the node 66 for the category "Disk directory Machine 3." The disk directory for Machine 3, generally labeled 74, is displayed in the pane 54.

Figure 7:
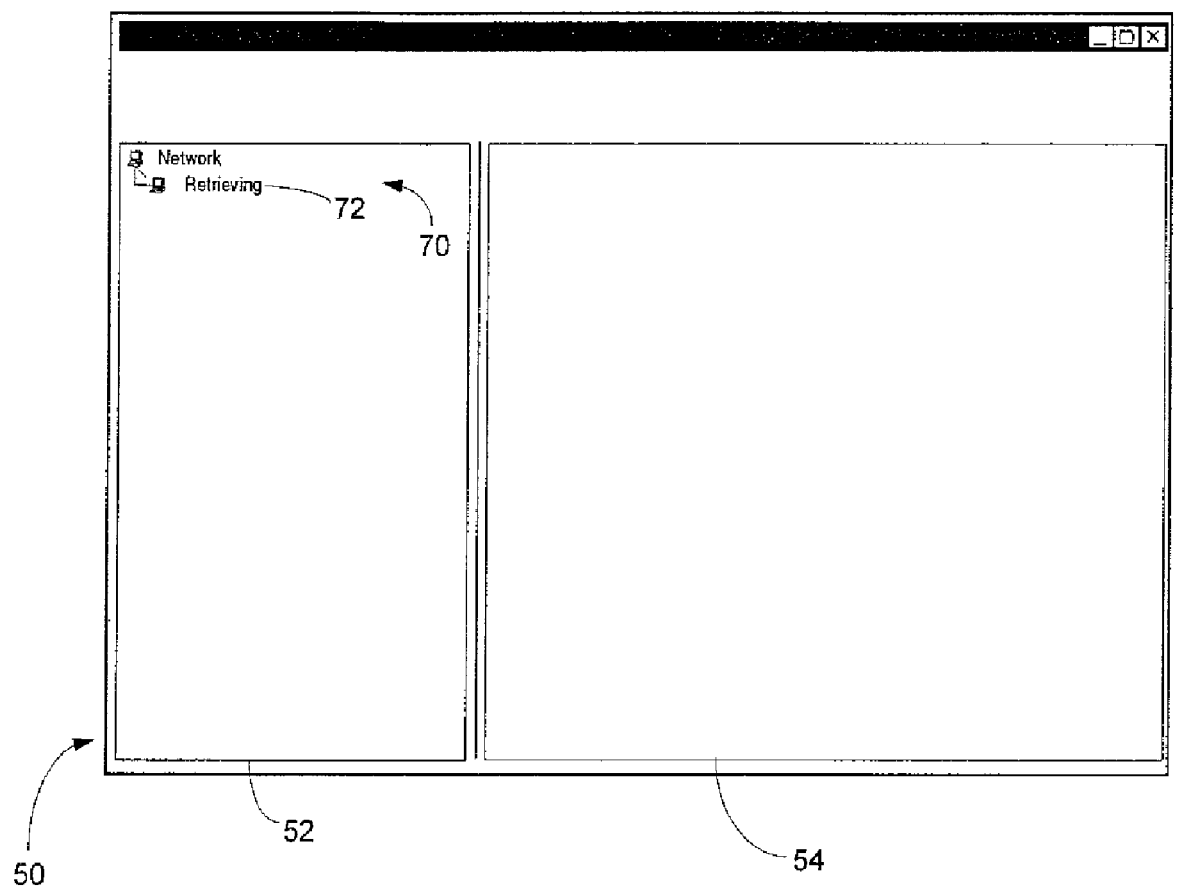

When the program that displays the user interface 50 is executed, it does not have any initial knowledge as to what categories are supposed to be listed in the right pane 52. The program obtains this information in a process referred to herein as "populating" the categories or, in the example user interface 50 (FIG. 6), populating the tree 68 with nodes. This process may be fast, or, if there is some problem in retrieving the node data—e.g. the names of the categories are stored on a remote server that has crashed—this process may be very slow. In conventional user interfaces, the user interface simply freezes until the tree can be populated. According to an embodiment of the invention, a program retrieves the categories independently from displaying them. This technique helps ensure that the user interface does not freeze up with the categories are being retrieved or "populated." While the categories are being retrieved, the program gives status information to the user concerning the retrieval operation. Referring to FIG. 7, for example, the program displays an incomplete tree 70 on the user interface 50 while the category information is being retrieved. The tree 70 has a placeholder 72 as one of its nodes. The placeholder 72 tells the user the status of the remaining tree nodes. In this case, the remaining tree nodes are being retrieved, as signified by the "retrieving" label. According to an embodiment of the invention, if the program is implemented with independent threads of execution, the retrieving thread may retrieve data for all child nodes if it can be done with a single request to the data storage. Otherwise, the retrieving thread only retrieves direct descendents of the node being populated. This helps eliminate the unnecessary processing of data that is not needed immediately.

Figure 8:
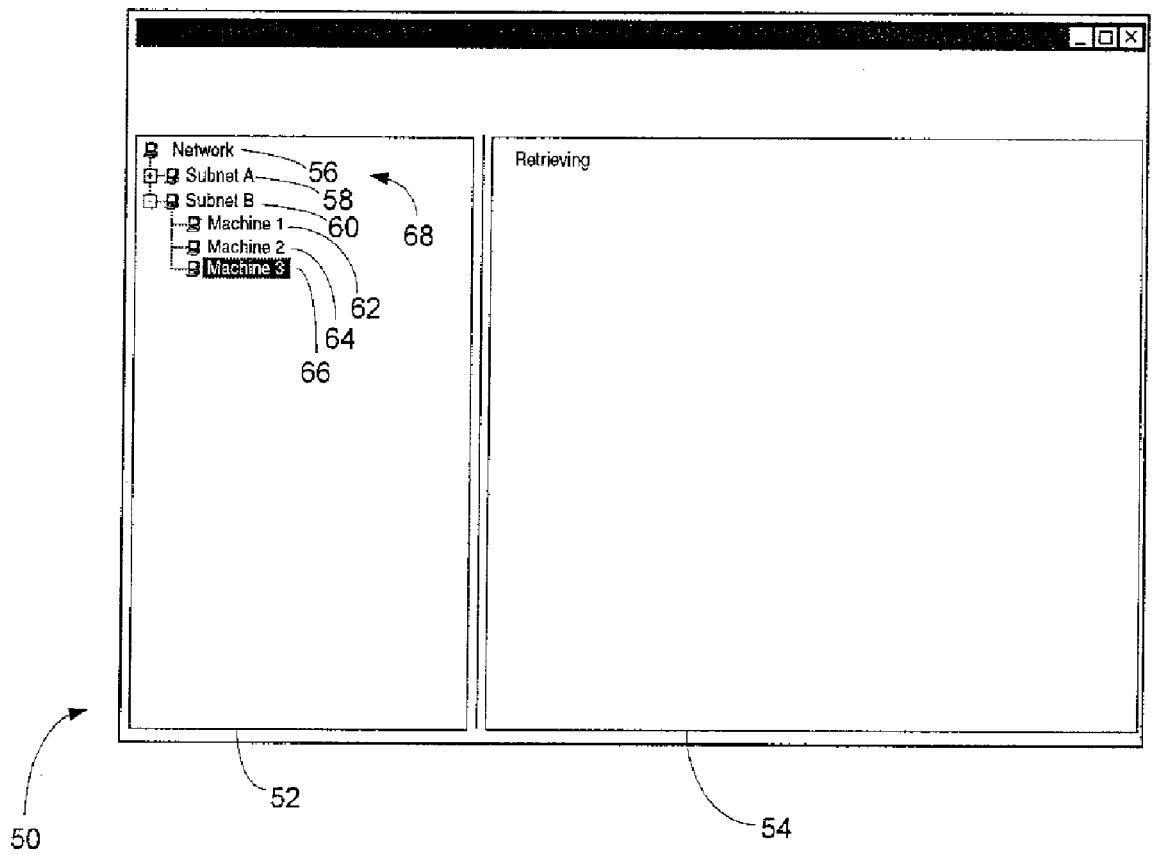

As previously discussed, many user interfaces allow the user to choose a category that describes the type of information the user would like to view. In response, the user interface displays data associated with that category. However, the data may have to be retrieved from a remote storage device, such as a computer located on the far side of a network, thus creating a delay in displaying the data on the user interface. Furthermore, the network link to the storage device may be lost, making it impossible to retrieve the data. In an embodiment of the invention, a program performs the function of displaying the categories independently from the function of retrieving the data for a selected category. This helps insure that the user interface does not freeze up while the data is being retrieved. While the data is being retrieved, the program gives status information to the user concerning the retrieval operation. Referring to FIG. 8, for example, the program displays a status message in the right pane 54 of the user interface 50. The message indicates the status of the data retrieval operation. In this case, the message is "retrieving" to indicate that data for the category "Machine 3" is being retrieved.

Referring to FIG. 6, an optional feature of the invention will now be described. According to the optional feature, the user may select multiple categories at a time. The program controlling the user interface 50 may, in response, independently retrieve data for each selected category. For example, the user might "click" on Machine 1 (node 62). The program controlling the user interface 50 would respond by retrieving the disk directory data for Machine 1. While the data for Machine 1 was being retrieved, the user may click on Machine 3 (node 66). The program could respond by retrieving the data for Machine 3 independently of retrieving the data for Machine 1 and independently of displaying the tree 68. The program could then display the data for one of the selected categories in the pane 54 while caching the data for the other selected category or categories. In the previous example, since the user selected Machine 1 and then selected Machine 3, the program might assume that the user was most interested in seeing the data for Machine 3. The program could then cache the data associated with Machine 1 when it arrived and display the data for Machine 3 when it arrived.

According to another optional feature, a user may cause the program to cancel a retrieval operation. Referring again to FIG. 6, a user may, for example, select Machine 3 (node 66) as the desired category of disk directory data. During retrieval of the disk directory data for Machine 3, the user may then change his mind and cancel the retrieval by, for example, right clicking on node 66 and selecting "cancel" on a pop-up menu. The program controlling the user interface 50 would respond by halting the data retrieval operation.

According to yet another optional feature, a user may cause the program to change the priority of a data retrieval, either explicitly, such as by using a pop-up menu or implicitly, such as by selecting new categories on the user interface. For example, if the user selects Machine 1, then selects Machine 2, and then select Machine 3, the program will have 3 independent data retrievals in progress. Since the last category selected was Machine 3, the program assumes that retrieval of the directory from Machine 3 is the most urgent and therefore gives it the highest priority. Thus the program preempts the retrieval of the Machine 1 and Machine 2 directory data. The program may also be configured to treat the selection of a category as an implicit request to boost priority. For example, the user may be permitted to boost the priority of the Machine 1 data retrieval by simply re-selecting Machine 1 (node 62). Other implicit priority boost schemes are possible. In an example of an explicit priority boost, the user may right click Machine 1 (node 62) and select "Boost priority" from a pop-up menu.

According to still another possible feature, the user may view incomplete or partial directory data in the right pane 54. For example, if the user has chosen Machine 3 (node 66 of FIG. 9) in the left pane 52, and the directory data associated with the computer "Machine 3" is taking some time to be retrieved, the user could move the cursor to the right pane 54, right-click, and choose "view partial results" from a pop-up menu.

According to yet another possible feature, nodes and data corresponding to nodes may be retrieved automatically, without any selection or request by the user, if it can be reasonably assumed that the user would want the nodes or data to be retrieved. For example, if a node has one child, then the nodes below it on the tree can be retrieved and populated automatically in advance.

According to still another possible feature, frequently chosen categories can be identified and requests for the retrieval of data corresponding to such categories can be automatically issued. This may be advantageous in cases where a node has multiple children. For example, if in FIG. 8, Machine 1 (node 62) was the most or one of the most often selected nodes, a request for the retrieval of directory data for Machine 1 may automatically be issued as soon as the Subnet B (node 58) was populated with the Machine 1 node. Thus, when the user does select the Machine 1 node, the directory data for Machine 1 may already be in cache, or may be on its way to cache. The most often selected node or nodes may be maintained on a list in memory.

Figure 9:
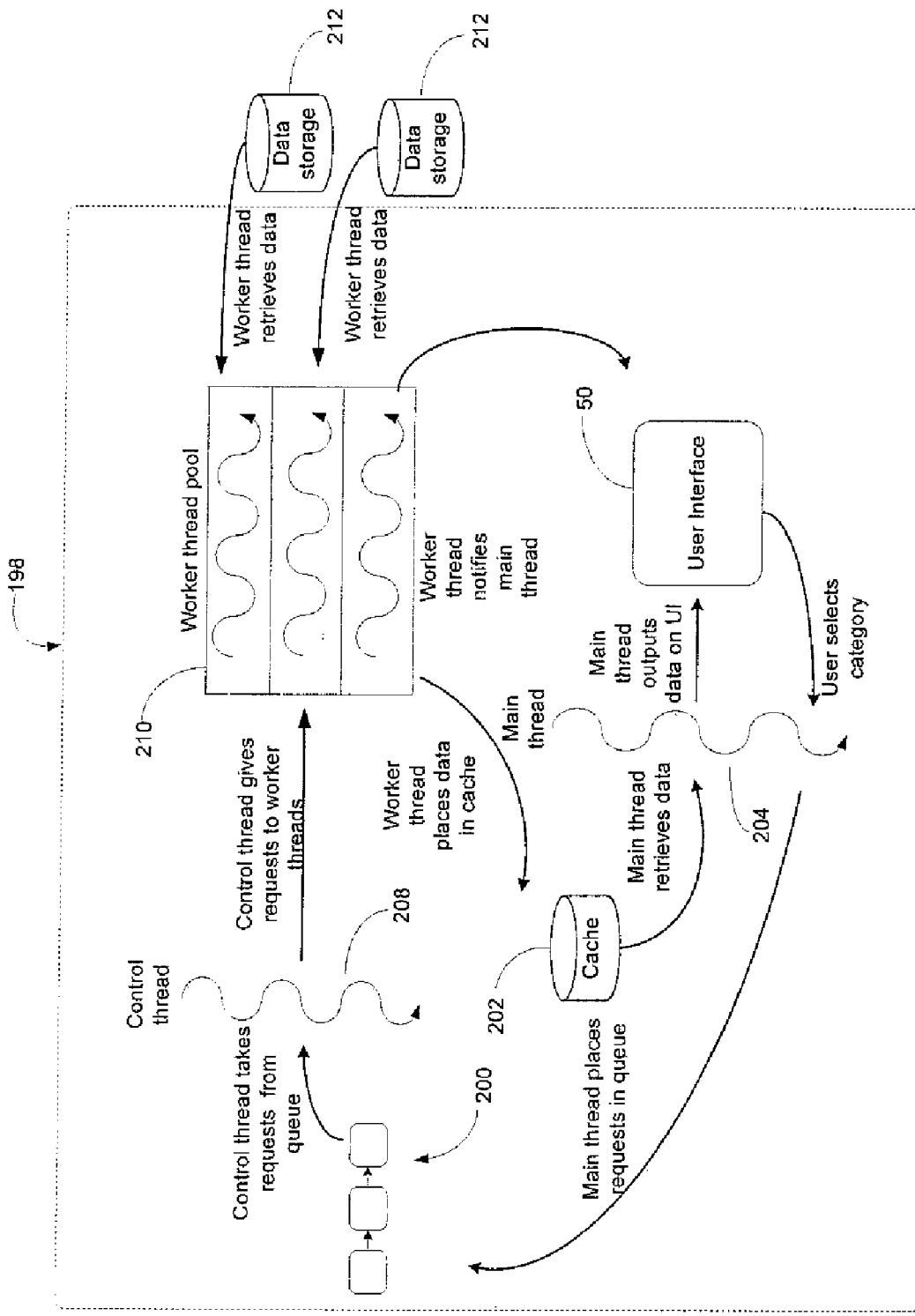
FIG. 9 is an example of an architecture that may be used in an embodiment of the invention; and, FIGS. 10-12 are flow diagrams showing how a main thread, a control thread and a worker thread function in an embodiment of the invention.

Referring to FIG. 9, the architecture and functionality of an embodiment of the invention will now be described. This embodiment executes as one or more program modules on a computer 198. The computer 198 includes a cache memory 202 and communicates with data storage units 212. The computer 198 executes a main thread 204, a control thread 208, and a pool 210 of worker threads. The main thread 204 creates and maintains user interface 50 (from FIGS. 6-8) through which the user can interact. When the main thread 204 initializes, it creates the control thread 208. The control thread 208 then creates the worker thread in the thread pool 210. The control thread sends one of the worker threads to obtain the category data for the tree 68. The worker thread retrieves the category data from one of the data storage units 212 and store the data directly to the tree data structure.

When the user selects a category from the left pane 52—such as by clicking a branch on the tree 68 labeled with that category—the main thread 204 first checks the cache 202 to see if the data is there. If not, it creates a request for the data associated with that category and places the request in a queue 200. The control thread 208 monitors the queue 200 and, if it detects an unprocessed request, it activates a worker thread from the thread pool 210. The worker thread then retrieves the data and places it in the cache 202. The worker thread notifies main thread 204. The main thread 204 displays the retrieved data in the right pane 54.

Referring to flow diagram of FIG. 10, the operation of the main thread 204 (FIG. 9) according to a more specific embodiment of the invention will now be described. After creating the control thread 208 the main thread 204 enters the state shown as block 220, in which it displays the tree 68 to the user, and populates it with those categories that are available. For those categories not yet available, the main thread displays a placeholder, such as the placeholder 72 shown in FIG. 7. As the category data is put into the tree data structure, the main thread 204 updates the tree 68 on the user interface 50.

Figure 10:
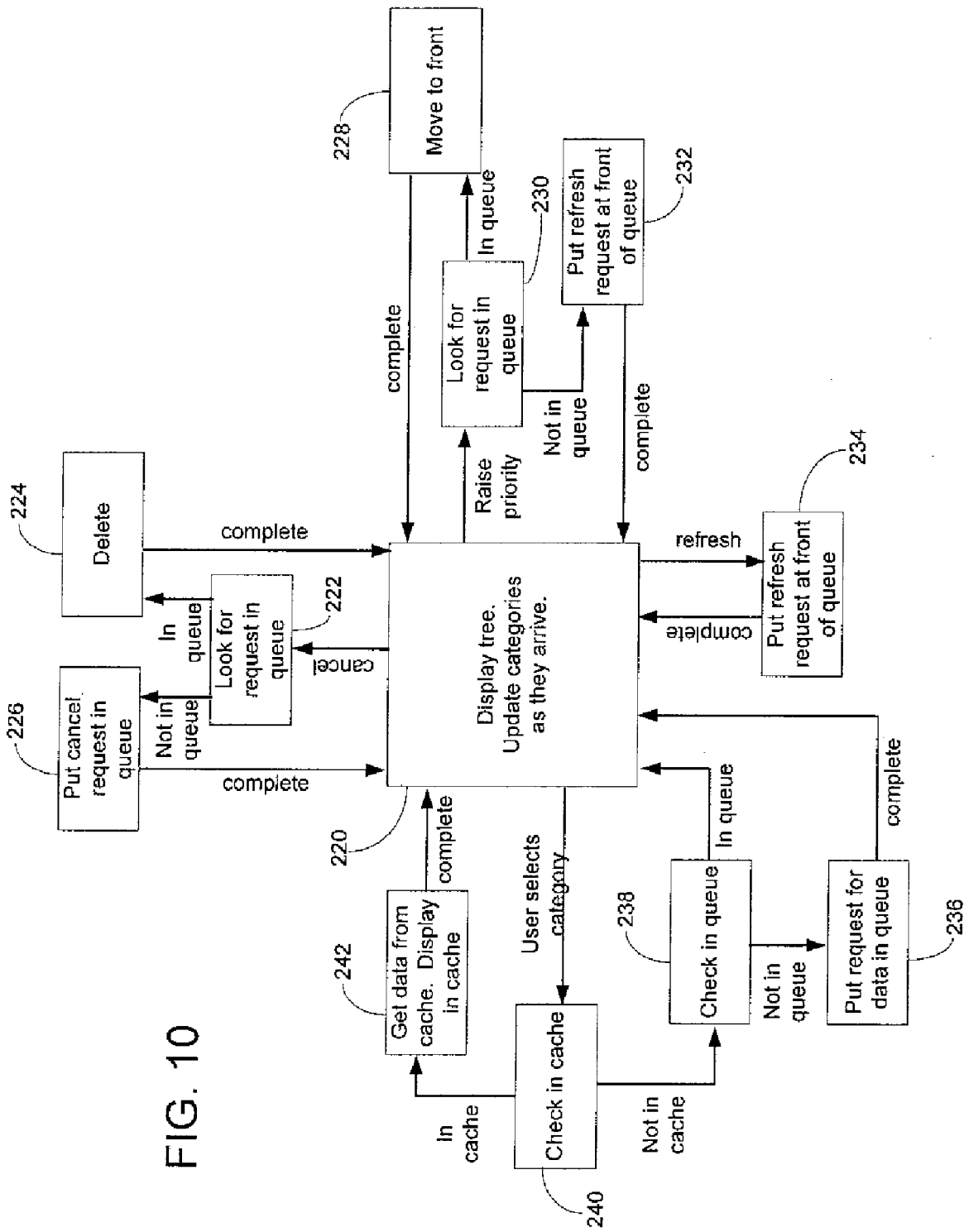

When the user selects a computer such as by clicking on a node of the tree 68, the state of the main thread moves to block 240 of FIG. 10. At block 240, the main thread checks the cache 202 (FIG. 9) to see if the disk directory data for the selected computer is there. If the data is there, the main thread moves to block 242, at which it retrieves the data from the cache and displays it in the right panel 54 (FIG. 6). When complete, the main thread returns to block 220. If the data is not in cache, then the main thread moves to block 238, in which it checks the queue 200 (FIG. 9) to determine if a request for the data has already been entered. If a request for the disk directory data associated this the selected machine is already in the queue, the main thread returns to block 220. If it is not already in the queue, then the main thread moves to block 236, at which it places a request for the disk directory data in the queue.

As previously described, a user may raise the priority of an in-progress retrieval of disk directory data by activating a pop-up menu, or by re-selecting a previously selected category. The main thread reacts by moving to block 230 (FIG. 10), at which it looks in the queue 200 (FIG. 9) to see if the request that is to be boosted is still there. If it is, then the main thread moves to block 228, at which the it moves the request to the front of the queue. If the request is not in the queue—such as when the request is already being serviced by a worker thread—then the main thread puts a request to have the priority of the data retrieval boosted. For example, if the user indicated that he wanted the priority of the retrieval operation for Machine 1 directory data (FIG. 6), then the main thread would look in the queue to see if the request for Machine 1 data was still pending. If it was then the main thread would move the request to the front of the queue. If not, then the main thread would put a new request at the front of the queue. The purpose of the new request would tell the control thread 208 to find the worker thread that is currently retrieving the Machine 1 directory data and boost its priority. The main thread would then return to block 220.

If the user indicates a desire to cancel a data retrieval, then the main thread reacts by moving to block 222 (FIG. 10) and looking in the queue 200 (FIG. 9) to locate the request data retrieval request. If the request is there, the main thread deletes it at block 224. If the request is not there—such as when it is already being serviced by a worker thread—the main thread puts a cancel request in the front of the queue 200 at block 226.

If the user indicates a desire to view the results retrieved so far with respect to one of the categories, the main thread responds by reading the data associated with the category, to the extent that it exists, from the cache 202 (FIG. 9) at block 242 of FIG. 10. The main thread then display the partially retrieved data in the right pane 54 of the display 50 (FIG. 6). For example, if the user selects Machine 3 and gets impatient, he could right click and select "View partial results." The main thread would then locate whatever disk directory data there was in the cache 202 and display it in the right pane 54.

Figure 11:
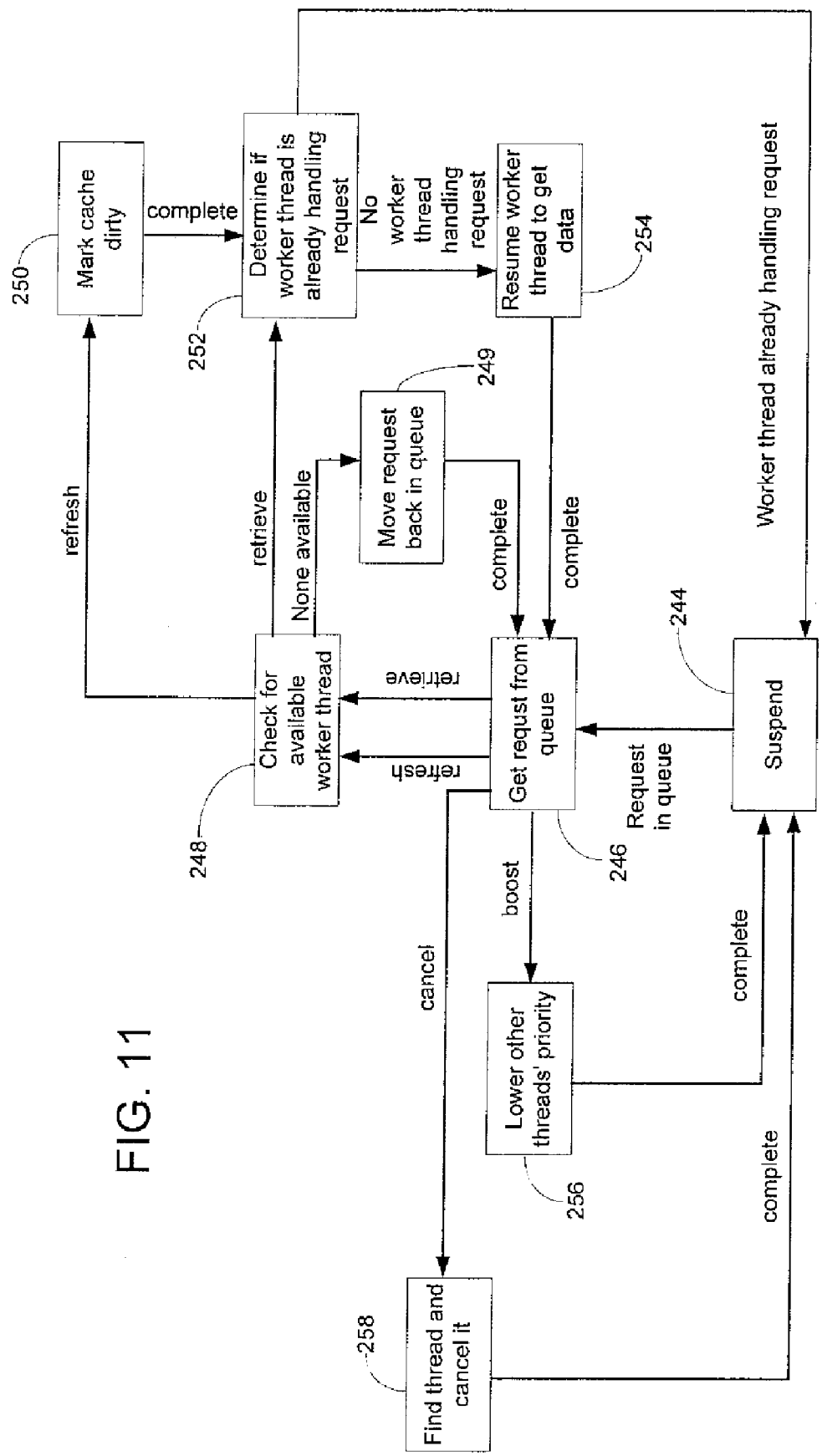

If the user indicates a desire to refresh the view of the data shown in the right pane 54, the main thread 204 (FIG. 9) places a refresh request at the front of the queue 200, as shown in block 234 of FIG. 11. It then returns to the suspended state at block 220.

Referring to FIG. 11, the operation of the control thread 208 (FIG. 9) according to a more specific embodiment of the invention will now be described. After initialization, the control thread suspends itself at block 244 until one or more requests arrives in the queue 200. The control thread then gets a request from the front of the queue at block 246. If the request is a boost request, the control thread proceeds to block 256, at which it determines which worker thread of the thread pool 210 (FIG. 9) is handling the request to be boosted. It then lowers for priority of the other active worker threads, such as by making the appropriate calls to the thread scheduler of the computer's operating system. If the request taken from the queue at block 246 is a cancel request, is the control thread proceeds to block 258, at which it locates the worker thread handling the request to be cancelled and cancels it. The control thread then returns to the suspended state at block 244.

If the request obtained from the queue 200 a request for the retrieval of data associated with a selected category, or is a request to have the view refreshed, then the control thread 208 proceeds to block 248 of FIG. 11. At block 248, the control thread determines if there is a worker thread in the thread pool 210 that is available to service the request. If there is not, the control thread proceeds to block 249, at which it moves the request back one position in the queue to defer it. The control thread flow then goes back to block 246. If there is a worker thread available at block 248, and the request is a request for data retrieval, then the flow proceeds to block 252. At block 252, the control thread determines whether a worker thread is already handling the data retrieval request. If no worker thread has been tasked to handle the request, the control thread resumes an available worker thread to retrieve the disk directory data at block 254. If there already is a worker thread handling the request, the flow returns to block 244, at which the control thread is suspended.

Referring again to block 248 of FIG. 11, if the request is a refresh request, then the control thread marks the cache dirty at block 250. The control thread then proceeds to block 252 and, if necessary block 254 just as if it had received the request for retrieval of data associated with a requested category for the first time.

Figure 12:
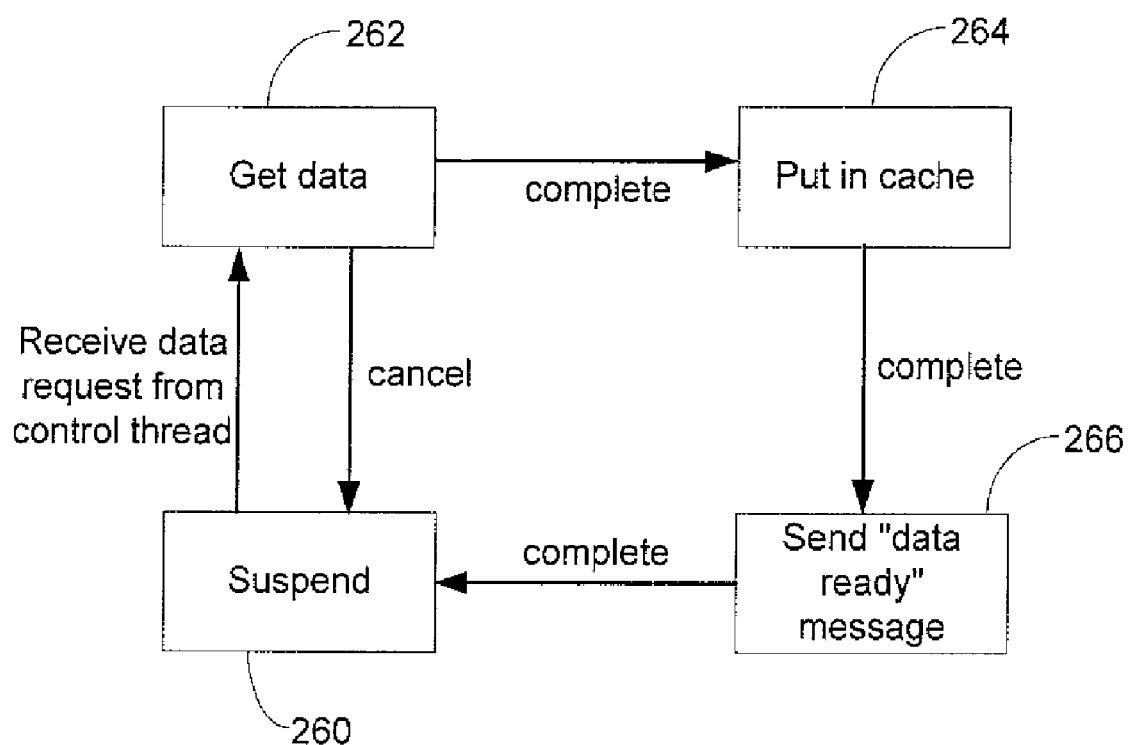

Referring to FIG. 12, the operation of a worker thread from the thread pool 210 (FIG. 9) will now be described. A worker thread stays in a suspended state at block 260 until it sent off by the control thread 208 to retrieve disk directory data. Once the worker thread is sent off, it goes to blocks 262, 264 and 266 to obtain the data, put it into cache, and notify the main thread that the data is ready. If it gets cancelled while retrieving data at block 262, it returns to the suspended state at block 260.

It can thus be seen that a new a useful method and system for displaying categorized information on a user interface has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. Apparatus for presenting hierarchical categorized directory information via a plurality of arranged visual elements on a computer-enabled user interface, wherein visual elements represent directory system entities and the arrangement of elements represents the interrelationships of the corresponding directory system entities, the apparatus comprising:
   a first thread for providing the plurality of arranged visual elements to the user interface;
   one or more inputs for receiving a user selection of a plurality of the visual elements and for receiving a user request to boost the retrieval priority of a particular one of the selected plurality of visual elements;
   a program module for boosting the priority of the particular selected visual element in response to receiving the user request; and
   a second thread for retrieving data associated with the plurality of the visual elements and giving priority to data associated with the particular selected visual element, so that the plurality of arranged visual elements remain responsive to user interaction while data associated with the plurality of the visual elements is being retrieved.

2. The apparatus of claim 1, wherein the first thread is a main thread and the second thread is a worker thread executing asynchronously with respect to the main thread.

3. The apparatus of claim 2, wherein the worker thread is further for notifying the main thread that the data is available after retrieving the data.

4. The apparatus of claim 2, wherein the worker thread is further for placing the retrieved data in a cache and wherein the main thread is further for accessing the data from the cache and displaying the data.

5. The apparatus of claim 1, wherein:
   the one or more inputs is further for receiving a user request to display a partially retrieved portion of the data; and the first thread is further for obtaining the partially retrieved portion from a cache in response to the user request and providing the partially retrieved portion to the user interface.

6. The apparatus of claim 1, wherein the displayed elements are arranged as nodes of a graphical hierarchy.

7. The apparatus of claim 6, wherein the graphical hierarchy is a tree.

8. The apparatus of claim 6, wherein the second thread is further for retrieving data for populating the graphical hierarchy.

9. The apparatus of claim 1, wherein the first thread is further for providing the retrieved data to the user interface, wherein the retrieved data is displayed in a different screen than the plurality of arranged visual elements.

10. A computer-enabled user interface for presenting hierarchical categorized directory information via a plurality of visual elements arranged thereon, wherein the visual elements represent directory system entities and the arrangement of elements represents the interrelationships of the corresponding directory system entities, the computer-enabled user interface being adapted to:
   display the plurality of arranged visual elements provided by a first thread;
   receive a user selection of a plurality of the visual elements for retrieval;
   receive a user request to boost a priority of the retrieval of a particular one of the displayed visual elements; and
   display data associated with the plurality of the displayed visual elements provided by a second thread, giving priority to retrieving data associated with the particular one of the visual elements, so that the plurality of arranged visual elements remain responsive to user interaction while data associated with the plurality of the visual elements is being retrieved.

11. The computer-enabled user interface of claim 10, wherein the user interface is adapted to receive an implicit user request to boost the priority.

12. The computer-enabled user interface of claim 10, wherein the user interface is adapted to boost the priority of the particular one of the visual elements based on an order in which the displayed visual elements are selected by the user.

13. The computer-enabled user interface of claim 10, wherein the user interface is adapted to receive a user re-selection of one of the selected displayed visual elements, and to boost the priority associated with retrieval of the re-selected displayed visual element.

14. The computer-enabled user interface of claim 10, wherein the user interface is adapted to receive an explicit user request to boost the priority.

15. The computer-enabled user interface of claim 10, wherein the user interface is adapted to present a pop-up menu through which the user may provide an explicit request to boost the priority of a selected one of the selected displayed visual elements.

16. A computer-enabled user interface, comprising:
   a first pane adapted to display respective graphical representations of a plurality of nodes by using a first thread, wherein the graphical representations of the nodes are responsive to user input to select a plurality of the nodes for retrieval of data associated with the selected nodes; and
   a second pane adapted to display a graphical presentation of the data retrieved in response to the user input by using a second thread, so that the graphical representations of the nodes remain responsive to user interaction while data associated with the selected nodes is being retrieved;
   wherein the graphical representations of the nodes selected by the user are operative to enable the retrieval of the data for the selected nodes to be prioritized.

17. The computer-enabled user interface of claim 16, wherein a graphical representation of a last-selected one of nodes is operative to enable assignment of a highest priority to retrieval of the data associated with the last-selected node.

18. The computer-enabled user interface of claim 16, wherein a graphical representation of a re-selected one of the nodes is operative to enable assignment of a highest priority to retrieval of the data associated with the re-selected node.

19. The computer-enabled user interface of claim 16, wherein the graphical representation of one of the nodes is responsive to user input to present a pop-up menu enabling the user to submit an explicit request to boost a priority level associated with the retrieval of the data for the one node.

20. The computer-enabled user interface of claim 16, wherein the graphical representation of one of the nodes is responsive to user input to enable the user to cancel retrieval of the data for the one node.

* * * * *